United States Patent
Thomas (10) Patent No.: US 8,516,290 B1
(45) Date of Patent: Aug. 20, 2013

(54) CLOCKING SCHEME FOR BRIDGE SYSTEM

(75) Inventor: Christopher Thomas, San Diego, CA (US)

(73) Assignee: SMSC Holdings S.A.R.L., Luxembourg (LU)

( * ) Notice: Subject to any disclaimer, the term of this patent is extended or adjusted under 35 U.S.C. 154(b) by 659 days.

(21) Appl. No.: 12/698,752

(22) Filed: Feb. 2, 2010

(51) Int. Cl.
*G06F 13/42* (2006.01)
*G06F 13/14* (2006.01)
*G06F 13/36* (2006.01)

(52) U.S. Cl.
USPC ............ 713/400; 710/305; 710/306; 710/315

(58) Field of Classification Search
None
See application file for complete search history.

(56) References Cited

U.S. PATENT DOCUMENTS

| | | | | |
|---|---|---|---|---|
| 7,185,135 | B1* | 2/2007 | Briggs et al. | 710/315 |
| 7,411,439 | B2* | 8/2008 | Brox et al. | 327/333 |
| 2007/0110142 | A1* | 5/2007 | Sartore et al. | 375/219 |
| 2008/0010663 | A1* | 1/2008 | Wang et al. | 725/133 |
| 2008/0071963 | A1* | 3/2008 | Chow et al. | 710/313 |
| 2009/0037637 | A1* | 2/2009 | Wan | 710/315 |
| 2010/0014621 | A1* | 1/2010 | Lin et al. | 375/371 |
| 2010/0148817 | A1* | 6/2010 | Chen et al. | 326/30 |
| 2011/0175758 | A1* | 7/2011 | Iqbal et al. | 341/94 |

* cited by examiner

*Primary Examiner* — Ji H Bae
(74) *Attorney, Agent, or Firm* — King & Spalding L.L.P.

(57) ABSTRACT

Various techniques are provided for bridging interfaces, such as different interfaces for use with a host device. In one example, a system includes an asynchronous first interface adapted to transmit and receive data to and from a host device in accordance with a first protocol. A synchronous second interface is adapted to transmit and receive data to and from a device external to the host device in accordance with a second protocol. A bridge controller is adapted to convert the data received from the host device from the first protocol to the second protocol for transmission to the external device. A clock and data recovery (CDR) block is adapted to recover a clock signal from the first interface to synchronize the data received from the host device. The second interface is adapted to synchronize the converted second protocol data transmitted to the external device using the recovered clock signal.

13 Claims, 5 Drawing Sheets

CLOCKING SCHEME FOR BRIDGE SYSTEM

BACKGROUND

1. Technical Field

Embodiments of the present disclosure generally relate to device interfaces, and more particularly, to a bridge for high-speed interfaces.

2. Related Art

Host devices, such as personal computers, laptop computers, and other types of devices, may support a variety of different interfaces. Such interfaces may include, for example, Universal Serial Bus (USB) interfaces, Peripheral Component Interfaces (PCI), PCI Express (PCIe) interfaces, and other interfaces. Also, such interfaces may be implemented in accordance with substantially different protocols, clocking schemes, physical connectors, and other differences. As a result, host devices are often required to be outfitted with large numbers of different types of interfaces which may not interoperate well with each other.

Existing interface implementations may require large numbers of reference clocks and/or phase lock loop (PLL) circuits to facilitate synchronization of the various transmit and receive data streams provided by multiple interfaces. The implementation costs and power consumption of such reference clocks (e.g., reference clocks implemented with costly oscillators, such as crystal oscillators, that are used to generate reference clock signals) and PLL circuits can often render such designs impractical.

It is often difficult for host device manufacturers to contemplate all of the types of interfaces that a user may require in a host device. Also, the small form factor of certain host devices such as laptops may limit the number of interfaces that may be provided on a host device. As a result, users are often required to add additional interfaces to host devices.

In particular, laptop users may employ docking stations or port replicators to provide expandability and convenience for working at a desk. Unfortunately, docking stations typically require a proprietary high-speed connector to provide high-performance access to functions such as hard drives, displays, and network adapters. Thus, docking stations are often costly to implement due to the various types of proprietary connectors that typically must be used to support high throughput.

Port replicators generally use a relatively low speed standard peripheral interface to attach low performance functions such as serial ports, audio devices, and low-speed network adapters. Nevertheless, despite their lower cost, port replicators are typically limited in performance and cannot support high speed communications required by high performance peripheral devices. Accordingly, there is a need for a new approach to providing interface compatibility to host devices.

SUMMARY

Systems and methods according to one or more embodiments of the present disclosure provide for bridging different interfaces for use with a host device. According to an embodiment, a system includes an asynchronous first interface adapted to transmit and receive data to and from a host device in accordance with a first protocol; a synchronous second interface adapted to transmit and receive data to and from a device external to the host device in accordance with a second protocol; a bridge controller adapted to convert the data received from the host device from the first protocol to the second protocol for transmission to the external device; a clock and data recovery (CDR) block adapted to recover a clock signal from the first interface to synchronize the data received from the host device; and wherein the second interface is adapted to synchronize the converted second protocol data transmitted to the external device using the recovered clock signal.

According to another embodiment, a method includes receiving data from a host device at an asynchronous first interface in accordance with a first protocol; recovering a clock signal from the first interface to synchronize the data received from the host device; converting the data received from the host device from the first protocol to a second protocol; passing the converted second protocol data to a synchronous second interface; transmitting the converted second protocol data from the second interface to a device external to the host device in accordance with the second protocol; and synchronizing the converted second protocol data transmitted to the external device using the recovered clock signal.

According to another embodiment, a system includes an asynchronous first interface adapted to transmit and receive data to and from a host device in accordance with a first protocol; a synchronous second interface adapted to transmit and receive data to and from a device external to the host device in accordance with a second protocol; a bridge controller adapted to convert the data received from the host device from the first protocol to the second protocol for transmission to the external device and convert the data received from the external device from the second protocol to the first protocol for transmission to the host device; a first clock and data recovery (CDR) block adapted to recover a first clock signal from the first interface to synchronize the data received from the host device; a second CDR block adapted to recover a second clock signal from the second interface to synchronize the data received from the external device; and a reference clock comprising a crystal oscillator adapted to provide a reference clock signal to synchronize the converted first protocol data transmitted to the host device and synchronize the converted second protocol data transmitted to the external device.

According to another embodiment, a method includes receiving data from a host device at an asynchronous first interface in accordance with a first protocol; recovering a first clock signal from the first interface to synchronize the data received from the host device; converting the data received from the host device from the first protocol to a second protocol; passing the converted second protocol data to a synchronous second interface; transmitting the converted second protocol data from the second interface to a device external to the host device in accordance with the second protocol; generating a reference clock signal using a crystal oscillator; synchronizing the converted second protocol data transmitted to the external device using the reference clock signal; receiving data from the external device at the second interface in accordance with the second protocol; recovering a second clock signal from the second interface to synchronize the data received from the external device; converting the data received from the external device from the second protocol to the first protocol; passing the converted first protocol data to the first interface; transmitting the converted first protocol data from the first interface to the host device in accordance with the first protocol; and synchronizing the converted first protocol data transmitted to the host device using the reference clock signal.

The scope of the disclosure is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

Embodiments of the present invention and their advantages are best understood by referring to the detailed description that follows. It should be appreciated that like reference numerals are used to identify like elements illustrated in one or more of the figures.

DETAILED DESCRIPTION

In accordance with various embodiments described herein, a bridge system may be used to facilitate communication between different interfaces employing different protocols (e.g., such as USB 3.0 interfaces, PCIe interfaces, legacy PCI interfaces, or other interfaces). For example, in one embodiment, a bridge system may be used to facilitate communication between a host device supporting an asynchronous interface, such as a USB 3.0 interface, and one or more devices supporting synchronous interfaces, such as PCIe or legacy PCI interfaces. In this regard, the bridge system may be attached to a USB 3.0 interface of a host device and may be used to permit PCIe or legacy PCI devices to be attached externally to the host device through the bridge system and share transmit and receive operations (e.g., including derived spread spectrum clocking) between the USB 3.0 interface and one or more PCIe or legacy PCI interfaces.

In accordance with embodiments described herein, a bridge system may be implemented with various clock configurations. For example, in one embodiment, a plurality of reference clocks may be used to provide different reference clock signals, and a plurality of CDR blocks may be used to provide different recovered clock signals (e.g., extracted using clock and data recovery techniques), to synchronize the different interfaces. In another embodiment, a single reference clock may be used to provide the same reference clock signal, and a plurality of CDR blocks may be used to provide different recovered clock signals, to synchronize the different interfaces. In yet another embodiment, a clock signal may be recovered from an asynchronous interface using a single CDR block, and the same recovered clock signal may be used to synchronize the asynchronous interface and one or more synchronous interfaces (e.g., in such an embodiment, only a single CDR block is used and no reference clocks are used). The clock signals used in various embodiments described herein may be implemented as, for example, modulated clock signals (e.g., spread spectrum clocks or other modulated clock signals) or non-modulated clock signals.

Generally speaking, interfaces may be either synchronous or asynchronous. In synchronous interfaces (e.g., PCIe or legacy PCI interfaces), a clock (e.g., a 100 MHz clock, a spread spectrum clock, or other clock) synchronized to a bit stream is provided separately from received data. This separately provided clock may be received by a device and also used (e.g., or an integer multiple thereof) to also synchronize data transmissions from the device through the synchronous interface.

In asynchronous interfaces (e.g., USB 3.0 interfaces), a clock is recovered from received data without another clock signal being transmitted separately from the data. A locally generated reference clock, or a clock recovered from a received serial bitstream, may be used to synchronize data transmission from the device through the asynchronous interface.

PCIe and USB 3.0 interfaces may both employ spread-spectrum clocking (SSC), may be used to reduce peak electromagnetic interference (EMI) by applying a slow-moving frequency modulation to a data stream. In synchronous systems, SSC may also be present on the clock provided separately from the received data. For example, synchronous systems may apply SSC to the transmitted data signals by using a received reference clock, which already has SSC modulation, to generate the high-speed transmit clock.

In contrast, asynchronous systems typically must add SSC modulation to a local reference clock. However, adding SSC modulation may require the implementation of a fractional-N synthesizer and digital modulation to maintain high performance. Such implementations may be costly in terms of the amount of silicon area required and the associated power consumption. As a result, it is generally more efficient to avoid having to implement SSC modulation.

Alternatively, asynchronous systems may recover SSC from a recovered clock and for use in transmitting data signals. Receiving devices may be implemented to track SSC modulation in order to achieve error-free data recovery. In various implementations, USB 3.0 interfaces employ an SSC modulation scheme that is compatible with SSC modulation schemes used in PCIe interfaces (e.g., when SSC modulation is optionally implemented in PCIe interfaces).

Figure 1:
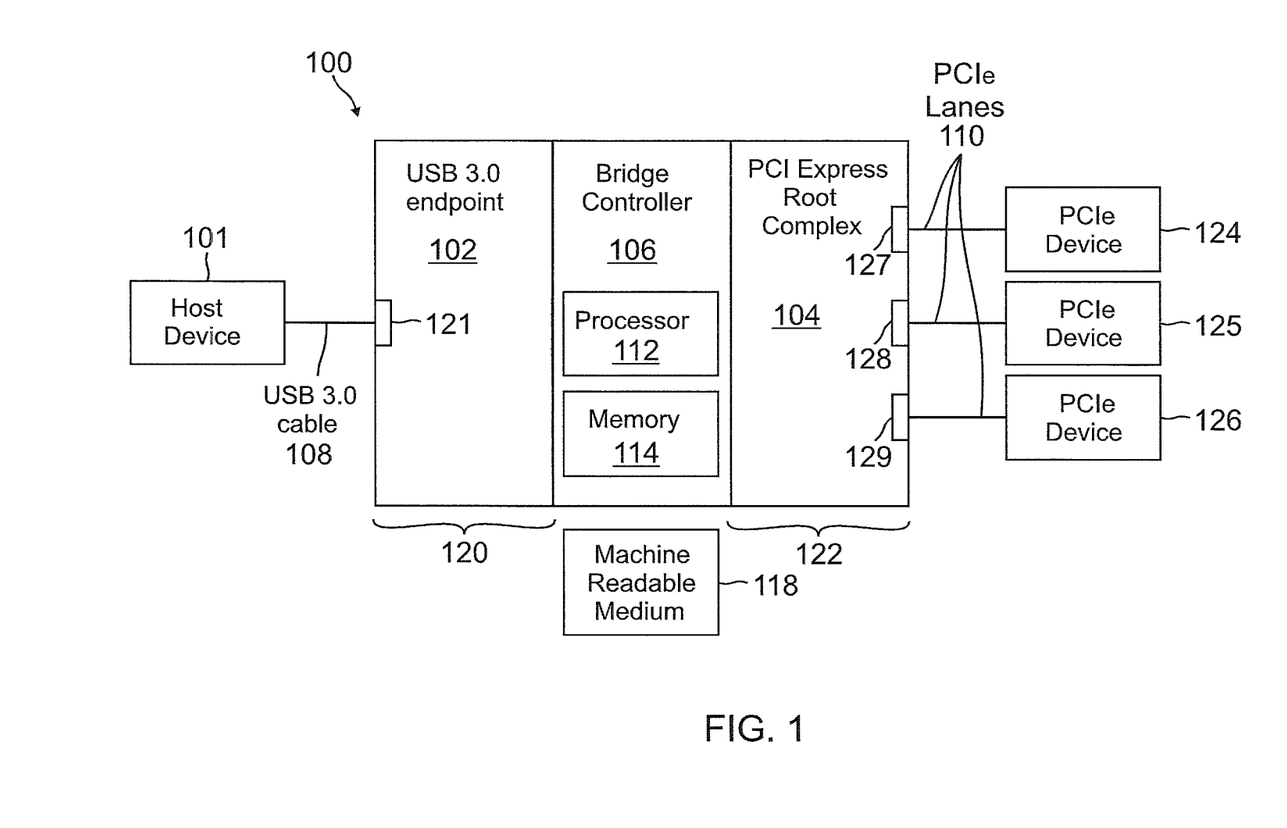
FIG. 1 illustrates a bridge system for connecting a host device to one or more external devices in accordance with an embodiment of the present invention.

FIG. 1 illustrates a bridge system 100 for connecting a host device 101 to one or more external devices 124-126 in accordance with an embodiment of the present invention. Host device 101 may be, for example, a personal computer, a laptop computer, or any other type of host device. External devices 124-126 may be, for example, peripheral devices to be used by host device (e.g., hard drives, displays, network adapters, or other peripheral devices) or any other type of external device. Although three external devices 124-126 are shown in FIG. 1, any desired number of external devices may be connected.

Bridge system 100 includes an asynchronous interface 120 supported by an endpoint 102 (e.g., a bridge endpoint that may describe the various interfaces bridged by bridge system 100 and may buffer data passed between such interfaces) and a port 121. Interface 120 may be implemented to transmit and receive data to and from host device 101 in accordance with a first protocol, such as a USB 3.0 protocol. Although interface 120 is illustrated as a single USB 3.0 interface operating in accordance with a USB 3.0 protocol, other types of interfaces (e.g., other types of USB interfaces, serial advanced technology attachment (SATA) interfaces, external SATA (eSATA) interfaces, or other interfaces) and other desired numbers of interfaces may be used in other embodiments.

Bridge system 100 also includes a plurality of synchronous interfaces 122 supported by a root complex 103 (e.g., as referred to as a bus arbiter, bus master, parent port, or senior port of a bus that may be responsible for data traffic routing and may be upstream to endpoints and devices) and ports 127-129. Interfaces 122 may be implemented to transmit and receive data to and from external devices 124-126 in accordance with a second protocol, such as a PCIe protocol. Although interfaces 122 are illustrated as PCIe interfaces operating in accordance with a PCIe protocol, other types of interfaces (e.g., legacy PCI interfaces or other interfaces) and other desired numbers of interfaces may be used in other embodiments.

Bridge system 100 also includes a bridge controller 106. In one embodiment, bridge controller 106 may be implemented as a direct memory access ("DMA") controller. Bridge controller 106 may be configured to convert data received from host device 101 through interface 120 from the first protocol to the second protocol, and pass the converted second protocol data to one or more of external devices 124-126 through interfaces 122. Bridge controller 106 may also be configured to convert data received from one or more of external devices 124-126 through interface 122 from the second protocol to the first protocol, and pass the converted first protocol data to host device 101 through interface 120.

In one embodiment, bridge controller 106 includes a processor 112 and a memory 114. Processor 112 may be configured with appropriate software (e.g., a computer program for execution by processor 112) that is stored on a machine readable medium 118 (e.g., a CD-ROM or other appropriate medium) and/or in memory 114 to instruct processor 112 to perform one or more of the operations described herein with regard to bridge system 100. In another embodiment, bridge controller 106 may be implemented using dedicated hardware.

Bridge system 100 may be used to interface with a variety of different devices (e.g., host device 101 and external devices 124-126) over various ports (e.g., ports 121 and 127-129). In one embodiment, bridge system 100 may be implemented on a chip (e.g., an integrated circuit) that manages communications between host device 101 and one or more of external devices 124-126.

The bridging of root complex 103 to endpoint 102 through bridge controller 106 allows the attachment of external devices 124-126 to host device 101. For example, in one embodiment, PCIe lanes 110 may connect external devices such as PCIe cards or other types of devices to bridge system 100, and a USB 3.0 cable 108 may connect host device 101 to bridge system 100. Bridge system 100 may be used to permit transmit and/or receive operations to be shared between USB3.0 device endpoint 102 and PCIe root complex 103, including derived SSC.

Bridge system 100 may be implemented in accordance with various clocking schemes. For example, in one embodiment, bridge system 100 may generate one or more clocks (e.g., SSC clocks by modulating one or more local reference clocks, or non-SSC clocks) for use in transmitting data signals to host device 101 and/or external devices 124-126 and/or. In another embodiment, data signals transmitted to external devices 124-126 and/or host device 101 may be synchronized using a clock (e.g., an SSC clock or non-SSC clock) recovered from data signals received from host device 101.

In another embodiment, an SSC clock recovered from data signals received from host device 101 in accordance with the first protocol may permit one or more of interfaces 122 to be used in accordance with the first protocol to operate interfaces 122 as a hub for host device 101 in accordance with the first protocol. In another embodiment, unused pins of one or more ports 127-129 may be used to support operation in accordance with a USB 2.0 protocol.

Figure 2:
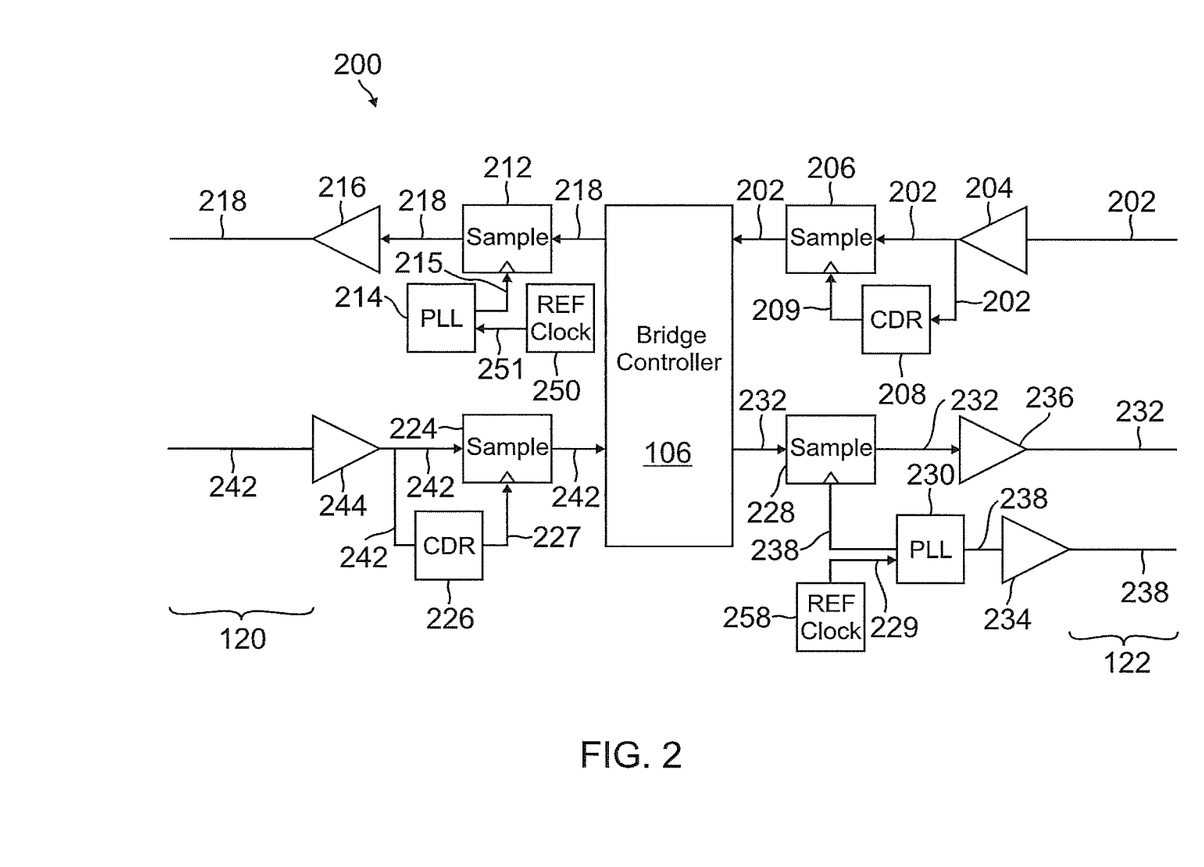
FIG. 2 illustrates a block diagram showing a clocking scheme of a bridge system implemented with a plurality of reference clocks and a plurality of CDR blocks in accordance with an embodiment of the present invention.

FIG. 2 illustrates a block diagram 200 showing a clocking scheme of a bridge system implemented with a plurality of reference clocks and a plurality of CDR blocks in accordance with an embodiment of the present invention. In one embodiment, the various features shown in block diagram 200 may be used to implement bridge system 100 of FIG. 1.

In the embodiment shown in FIG. 2, no clock sharing occurs between interfaces 120 and 122. In particular, separate reference clocks 250 and 258 may be used to generate separate reference clock signals 251 and 229 for synchronizing data transmitted by interfaces 120 and 122. Also, separate recovered clock signals 227 and 209 may be used for synchronizing data received by interfaces 120 and 122.

As discussed, bridge controller 106 may be configured to convert data between different protocols. In this regard, bridge controller 106 may be configured to convert a receive data stream 242 (e.g., data received in accordance with an asynchronous protocol such as USB 3.0) into a transmit data stream 232 (e.g., data to be transmitted in accordance with a synchronous protocol such as PCIe). Also, bridge controller 106 may be configured to convert a receive data stream 202 (e.g., data received in accordance with a synchronous protocol such as PCIe) into a transmit data stream 218 (e.g., data to be transmitted in accordance with an asynchronous protocol such as USB 3.0).

Transmit and receive data streams 218 and 242 may be transmitted and received to and from host device 101 through interface 120. Receive data stream 242 may be synchronized using a recovered clock signal 227 provided by a clock and data recovery (CDR) block 226. In this regard, receive data stream 242 may be passed through a buffer 244, sampled by a sample block 224 using recovered clock signal 227, and passed to bridge controller 106.

Transmit data stream 218 may be synchronized using a reference clock signal 251 provided by a reference clock 250. In this regard, reference clock 250 may be implemented with a crystal oscillator to generate reference clock signal 251. A phase lock loop (PLL) 214 may receive reference clock signal 251 and may generate a matching reference clock signal 215 used by a sample block 212 to sample transmit data stream 218 provided by bridge controller 106. Transmit data stream 218 is passed from sample block 224 through a buffer 216 and on to host device 101 through interface 120.

Transmit and receive data streams 232 and 202 may be transmitted and received to and from one of external devices 126-129 through one of interfaces 122. Receive data stream 202 may be synchronized using a recovered clock signal 209 provided by a CDR block 208. In this regard, receive data stream 202 may be passed through a buffer 204, sampled by a sample block 206 using recovered clock signal 209, and passed to bridge controller 106.

Transmit data stream 232 may be synchronized using a reference clock signal 229 provided by a reference clock 258. In this regard, reference clock 258 may be implemented with a crystal oscillator to generate reference clock signal 229. A PLL 230 may receive reference clock signal 229 and may generate a matching reference clock signal 238 used by a sample block 228 to sample transmit data stream 232 provided by bridge controller 106. Transmit data stream 232 is passed from sample block 228 through a buffer 236 and on to one of external devices 124-126 through interface 122. Also, matching reference clock signal 238 may be passed through a buffer 234 and on to one of external devices 124-126 through interface 122.

As discussed, interface 122 may be implemented as a synchronous interface in one embodiment. In this case, one of external devices 124-126 may separately receive transmit data stream 232 and reference clock signal 238 (e.g., reference clock signal 238 is not embedded in transmit data stream 232 in this embodiment).

Figure 3:
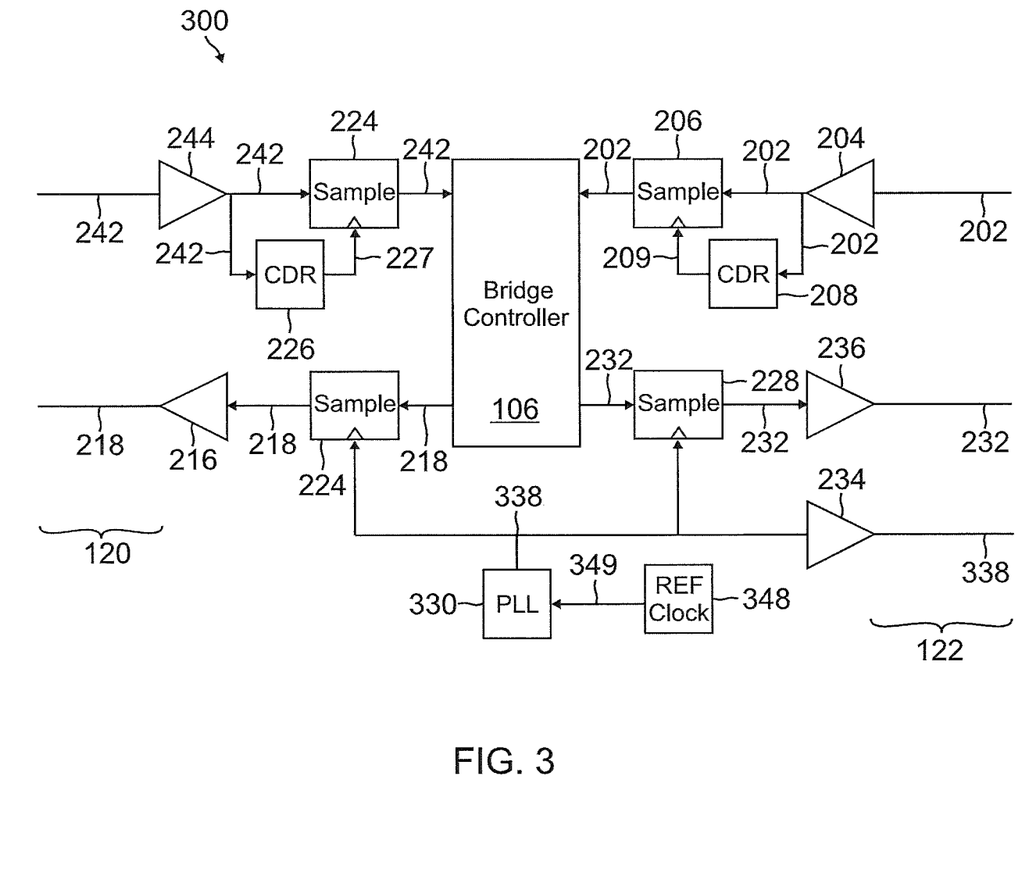
FIG. 3 illustrates a block diagram showing a clocking scheme of a bridge system implemented with a single reference clock and a plurality of CDR blocks in accordance with an embodiment of the present invention.

FIG. 3 illustrates a block diagram 300 showing a clocking scheme of a bridge system implemented with a single reference clock and a plurality of CDR blocks in accordance with an embodiment of the present invention. In one embodiment, the various features shown in block diagram 300 may be used to implement bridge system 100 of FIG. 1.

Various features of FIG. 2 are provided in FIG. 3 and may be operated in a similar manner as previously described with regard to FIG. 2. However, in FIG. 3, a single reference clock 348 and a single PLL 330 are provided in place of reference clocks 250 and 258 and PLLs 214 and 230 of FIG. 2. In this regard, reference clock 348 may be shared between interfaces 120 and 122 and may be used to generate a reference clock signal 349 for synchronizing data transmitted by interfaces 120 and 122. Advantageously, the use of shared reference clock 348 may significantly reduce costs associated with the clocking scheme of FIG. 3 in comparison to the clocking scheme of FIG. 2 due to the relatively high costs associated with reference clocks incorporating crystal oscillators. Also, the use of single PLL 330 may reduce power consumption and implementation costs in comparison to the clocking scheme of FIG. 2.

In FIG. 3, reference clock 348 may be implemented with a crystal oscillator to generate reference clock signal 349. PLL 330 may receive reference clock signal 349 and may generate a matching reference clock signal 338 used by sample blocks 224 and 228 to sample transmit data streams 218 and 232 provided by bridge controller 106.

Transmit data stream 218 is passed from sample block 224 through buffer 216 and on to host device 101 through interface 120. Transmit data stream 232 is passed from sample block 228 through buffer 236 and on to one of external devices 124-126 through interface 122. Also, reference clock signal 338 may be passed through buffer 234 and on to one of external devices 124-126 through interface 122.

Figure 4:
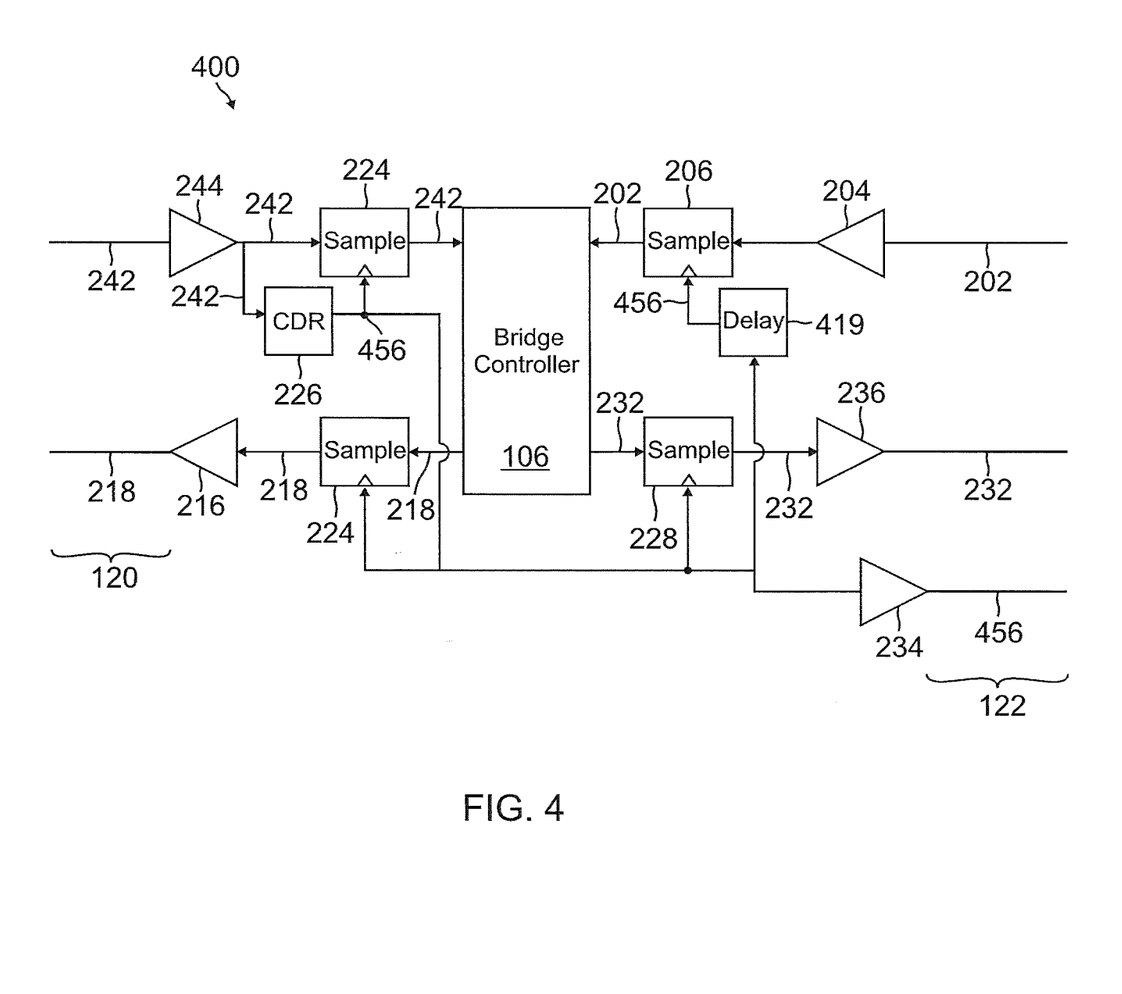
FIG. 4 illustrates a block diagram showing a clocking scheme of a bridge system implemented with only a recovered clock signal provided by a CDR block in accordance with an embodiment of the present invention.

FIG. 4 illustrates a block diagram 400 showing a clocking scheme of a bridge system implemented with only a recovered clock signal provided by a CDR block in accordance with an embodiment of the present invention. In one embodiment, the various features shown in block diagram 400 may be used to implement bridge system 100 of FIG. 1.

Various features of FIG. 4 are provided in FIGS. 2-3 and may be operated in a similar manner as previously described with regard to FIGS. 2-3. However, in FIG. 4, no reference clock is provided, and no PLLs are provided. In this regard, a single recovered clock signal 456 provided by CDR block 226 may be used for synchronizing data transmitted by interfaces 120 and 122, and also for synchronizing data received by interfaces 120 and 122.

Advantageously, the use of recovered clock signal 456 instead of reference clocks may significantly reduce costs associated with the clocking scheme of FIG. 4 in comparison to the clocking schemes of FIGS. 2-3 due to the relatively high costs associated with reference clocks incorporating crystal oscillators. Also, the absence of PLLs in FIG. 4 may reduce power consumption and implementation costs in comparison to the clocking schemes of FIGS. 2-3. Also, the use of only a single CDR block 226 in FIG. 4 may further reduce power consumption and implementation costs in comparison to the clocking schemes of FIG. 2-3.

Additionally, because both of interfaces 120 and 122 are synchronized with each other using the single recovered clock signal 456 in FIG. 4, elastic buffers for synchronizing data streams (e.g., used to compensate for frequency differences between data streams of different interfaces) need not be provided and may thus reduce implementation costs and also increase performance due to the removal of latency associated with such elastic buffers.

In FIG. 4, CDR block 226 may recover clock signal 456 from receive data stream 242. As shown in FIG. 4, recovered clock signal 456 may be provided to sample blocks 224 and 228. Recovered clock signal 456 may also be provided to a delay block 419 which delays recovered clock signal 456 before it is provided to sample block 206. In this regard, delay block 419 may be used to compensate for phase differences between recovered clock signal 456 and receive data stream 202. In one embodiment, delay block 419 may be implemented as a delay-locked-loop (DLL). Advantageously, such a DLL may be implemented in a more efficient manner than a CDR block. Accordingly, the embodiment illustrated in FIG. 4 may be implemented more efficiently than other embodiments which may use one or more additional CDR blocks. Also, recovered clock signal 456 may be passed through buffer 234 and on to one of external devices 124-126 through interface 122.

Although only a single interface 122 (e.g., a single port PCIe interface) has been described with regard to FIGS. 2-4, any desired number of interfaces 122 may be implemented in bridge system 100. As a result, the savings in power consumption, silicon materials, and implementation costs associated with various embodiments described herein may be even greater for embodiments employing large numbers of interfaces 122. For example, by using recovered clock signal 456 to synchronize four transmit data streams 232 and four receive data streams 202 collectively provided by four interfaces 122 (e.g., a total of eight data streams), at least seven PLLs may be eliminated in comparison with a conventional implementation in which a separate PLL may be used for each of the transmit and receive data streams of each of the four interfaces 122.

In another embodiment, one or more of interfaces 122 may operate as a repeater for interface 120. In this regard, bridge controller 106 may selectively configure one or more of interfaces 122 to operate in accordance with the same protocol as interface 120 (e.g., a USB 3.0 protocol). For example, if at least two of interfaces 122 are configured by bridge controller 106 to operate in accordance with the same protocol as interface 120, then bridge system 100 may operate as a hub for host device 101 to permit, for example, two or more devices compatible with the protocol of interface 120 to be connected to host device 101 through interfaces 122 of bridge system 100.

Figure 5:
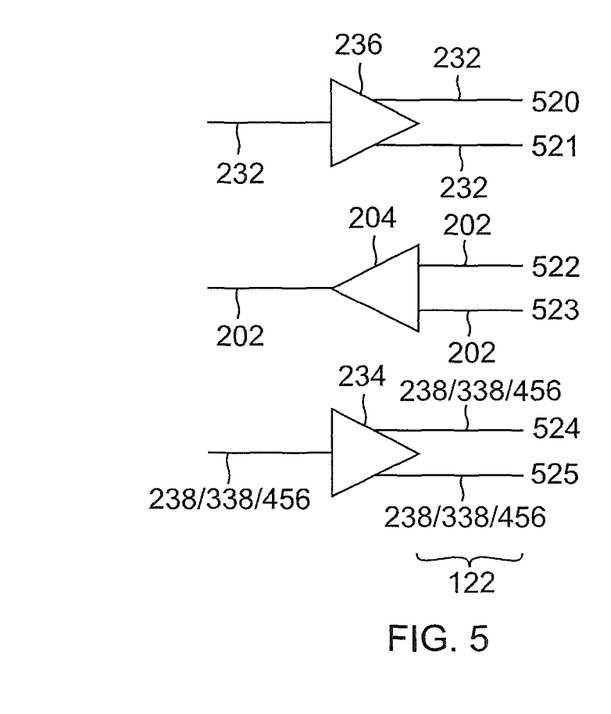
FIGS. 5-6 illustrate different modes of operating an interface of a bridge system in accordance with embodiments of the present invention.
Figure 6:
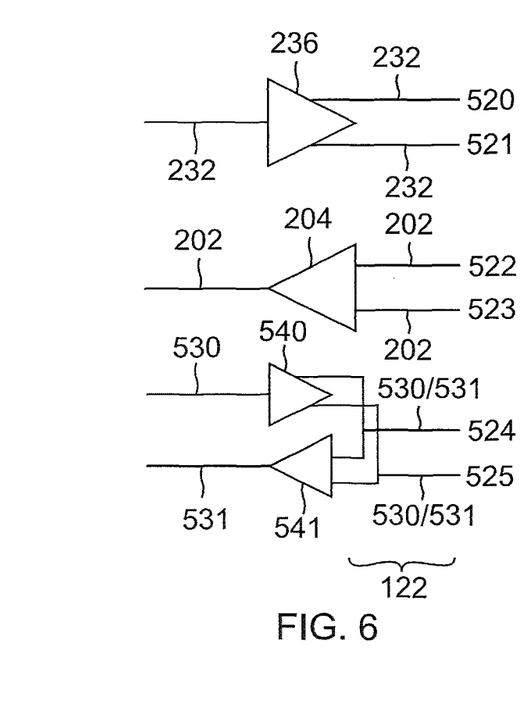

In another embodiment, one or more of interfaces 122 may be selectively configured by bridge controller 106 to operate in accordance with either an asynchronous protocol or a synchronous protocol. In this regard, FIGS. 5-6 illustrate different modes of operating one of interfaces 122 of bridge system 100 in accordance with embodiments of the present invention. In FIGS. 5-6, interface 122 has been implemented with at least six pins 520-525 configured to provide various differential signals.

In FIG. 5, interface 122 has been configured by bridge controller 106 to operate in accordance with a synchronous protocol (e.g., a PCIe protocol). Accordingly, in FIG. 5, pins 520-521 provide transmit data stream 232 in accordance with the synchronous protocol, pins 522-523 accept receive data stream 202 in accordance with the synchronous protocol, and pins 524-525 provide clock signal 238, 338, or 456 in accordance with the synchronous protocol.

In FIG. 6, interface 122 has been configured by bridge controller 106 to operate in accordance with an asynchronous protocol (e.g., a USB 3.0 protocol). Accordingly, in FIG. 6, pins 520-521 provide transmit data stream 232 in accordance with the asynchronous protocol and pins 522-523 accept receive data stream 202 in accordance with the asynchronous protocol. Because no separate clock signal is needed to support the asynchronous protocol in FIG. 6, pins 524-525 remain available for other uses. For example, in one embodiment, pins 524-525 may be used to transmit and receive data streams 530-531 in accordance with an asynchronous protocol (e.g., a USB 2.0 protocol). In this regard, pins 524-525 may be used to transmit and receive data streams 530-531 in accordance with legacy USB 2.0 signaling techniques while pins 520-521 and 522-523 are used to transmit and receive data streams 232 and 202 in accordance with USB 3.0 signaling techniques. As shown in FIG. 6, additional buffers 540-541 may also be provided.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more machine readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
   an asynchronous first interface which transmits and receives data to and from a host device in accordance with a first protocol;
   a synchronous second interface which transmits and receives data to and from a device external to the host device in accordance with a second protocol;
   a bridge controller which converts the data received from the host device from the first protocol to the second protocol for transmission to the external device;
   a clock and data recovery (CDR) block which recovers a clock signal from the first interface to synchronize the data received from the host device;
   a delay block which delays the recovered clock signal to synchronize the data received from the external device; and
   wherein the second interface synchronizes the converted second protocol data transmitted to the external device using the recovered clock signal.

2. The system of claim 1, wherein the first interface is a Universal Serial Bus (USB) 3.0 interface and the second interface is a Peripheral Component Interface Express (PCIe) interface.

3. The system of claim 1, wherein:
   the bridge controller is further adapted to convert the data received from the external device from the second protocol to the first protocol for transmission to the host device; and
   the first interface is adapted to synchronize the converted first protocol data transmitted to the host device using the recovered clock signal.

4. The system of claim 3, wherein the external device is a first external device, the system further comprising:
   a third interface adapted to transmit and receive data to and from a second device external to the host device in accordance with the second protocol;
   wherein the bridge controller is adapted to convert the data received from the second external device from the second protocol to the first protocol to provide additional converted first protocol data for transmission to the host device; and
   wherein the third interface is adapted to synchronize the converted second protocol data transmitted to the second external device using the recovered clock signal.

5. The system of claim 4, wherein:
   the second and third interfaces are adapted to be selectively configured by the bridge controller to operate in accordance with either the first protocol or the second protocol; and
   the system is adapted to operate as a hub for the host device when the second and third interfaces are configured to operate in accordance with the first protocol.

6. The system of claim 1, wherein the second interface is adapted to be selectively configured by the bridge controller to operate in accordance with either an asynchronous protocol or a synchronous protocol, wherein the second interface comprises at least a pair of pins adapted to:
   transmit and receive differential data signals to and from the external device when the second interface is configured to operate in accordance with the asynchronous protocol; and
   transmit the recovered clock signal as a differential clock signal when the second interface is configured to operate in accordance with the synchronous protocol.

7. A method comprising:
   receiving data from a host device at an asynchronous first interface in accordance with a first protocol;
   recovering a clock signal from the first interface to synchronize the data received from the host device;
   converting the data received from the host device from the first protocol to a second protocol;
   passing the converted second protocol data to a synchronous second interface;
   transmitting the converted second protocol data from the second interface to a device external to the host device in accordance with the second protocol;
   delaying the recovered clock signal; and
   synchronizing the converted second protocol data transmitted to the external device using the recovered clock signal.

8. The method of claim 7, wherein the first interface is a Universal Serial Bus (USB) 3.0 interface and the second interface is a Peripheral Component Interface Express (PCIe) interface.

9. The method of claim 7, further comprising:
synchronizing the data received from the external device using the delayed recovered clock signal.

10. The method of claim 7, further comprising:
receiving data from the external device at the second interface in accordance with the second protocol;
converting the data received from the external device from the second protocol to the first protocol;
passing the converted first protocol data to the first interface;
transmitting the converted first protocol data from the first interface to the host device in accordance with the first protocol; and
synchronizing the converted first protocol data transmitted to the host device using the recovered clock signal.

11. The method of claim 10, wherein the external device is a first external device, the method further comprising:
transmitting the converted second protocol data from a third interface to a second device external to the host device in accordance with the second protocol;
synchronizing the converted second protocol data transmitted to the second external device using the recovered clock signal;
receiving data from the second external device at the third interface in accordance with the second protocol;
converting the data received from the second external device from the second protocol to the first protocol to provide additional converted first protocol data;
passing the additional converted first protocol data to the first interface;
transmitting the additional converted first protocol data from the first interface to the host device in accordance with the first protocol; and
synchronizing the additional converted first protocol data transmitted to the host device using the recovered clock signal.

12. The method of claim 11, further comprising:
selectively configuring the second and third interfaces to operate in accordance with either the first protocol or the second protocol; and
providing a hub for the host device using the second and third interfaces when the second and third interfaces are configured to operate in accordance with the first protocol.

13. The method of claim 7, further comprising:
selectively configuring the second interface to operate in accordance with either an asynchronous protocol or a synchronous protocol;
transmitting and receiving differential data signals to and from the external device through at least a pair of pins of the second interface when the second interface is configured to operate in accordance with the asynchronous protocol; and
transmitting the recovered clock signal as a differential clock signal through the pins when the second interface is configured to operate in accordance with the synchronous protocol.

* * * * *